United States Patent
Hall et al.

(10) Patent No.: US 9,945,087 B2
(45) Date of Patent: Apr. 17, 2018

(54) OFFSHORE STRUCTURE

(71) Applicant: CONOCOPHILLIPS (U.K.) BRITANNIA LIMITED, London (GB)

(72) Inventors: David Leonard Hall, Cheadle Hulme (GB); Gary Dean, Chart Sutton (GB); Duncan Knight, Aberdeen (GB); Anthony Clark, Great Hatfield (GB); Andrew Kirkpatrick, Darlington (GB); Paul Oliver, Stockton (GB); Bruce John Munro, Oldmeldrum (GB); Lindsay Mckay, Peterculter (GB); Alan Rodger, Aberdeen (GB); Eric Reid, Aberdeen (GB); Donald Macleod, Aberdeenshire (GB)

(73) Assignee: CONOCOPHILLIPS (U.K.) BRITANNIA LIMITED, London (GB)

( * ) Notice: Subject to any disclaimer, the term of this patent is extended or adjusted under 35 U.S.C. 154(b) by 91 days.

(21) Appl. No.: 14/394,043

(22) PCT Filed: Apr. 9, 2013

(86) PCT No.: PCT/GB2013/050911
§ 371 (c)(1),
(2) Date: Oct. 10, 2014

(87) PCT Pub. No.: WO2013/153373
PCT Pub. Date: Oct. 17, 2013

(65) Prior Publication Data
US 2015/0147121 A1    May 28, 2015

(30) Foreign Application Priority Data
Apr. 11, 2012 (GB) .................................. 1206377.2

(51) Int. Cl.
*E02B 17/00* (2006.01)
*E02B 17/02* (2006.01)
(Continued)

(52) U.S. Cl.
CPC .............. *E02B 17/02* (2013.01); *E02B 17/00* (2013.01); *E02B 17/027* (2013.01);
(Continued)

(58) Field of Classification Search
CPC . E02B 17/02; E02B 17/027; E02B 2017/0086
See application file for complete search history.

(56) References Cited

U.S. PATENT DOCUMENTS 2,139,488 A      12/1938   Cicin
3,501,919 A  *   3/1970    Marshall ................. E02B 17/00
                                                           166/358

(Continued)

FOREIGN PATENT DOCUMENTS

GB      1525242 A      9/1978
GB      2203782 A      10/1988
(Continued)

OTHER PUBLICATIONS

International Search Report and Written Opinion for PCT/GB2013/050911, dated Mar. 4, 2014; ISA/EP.
(Continued)

*Primary Examiner* — Benjamin F Fiorello
(74) *Attorney, Agent, or Firm* — Harness, Dickey & Pierce, P.L.C.

(57) ABSTRACT

An offshore structure comprises: an original structure comprising a main platform supported via a foundation on a seabed; and an extension structure comprising a platform extension positioned laterally of the main platform and a platform extension support, depending downwardly from the platform extension, into contact with the foundation, so (Continued)

as to support the extension structure directly on the foundation.

21 Claims, 6 Drawing Sheets

(51) Int. Cl.
*F16C 23/04* (2006.01)
*F16C 33/74* (2006.01)

(52) U.S. Cl.
CPC ............ *F16C 23/045* (2013.01); *F16C 33/74* (2013.01); *E02B 2017/006* (2013.01); *E02B 2017/0039* (2013.01); *E02B 2017/0056* (2013.01); *E02B 2017/0073* (2013.01)

(56) References Cited

U.S. PATENT DOCUMENTS

| | | | | |
|---|---|---|---|---|
| 3,525,392 A | * | 8/1970 | Bailey | E21B 15/02 166/365 |
| 3,991,581 A | * | 11/1976 | Kolb | E02D 7/00 405/227 |
| 4,422,806 A | * | 12/1983 | Abbott | E02B 17/00 405/195.1 |
| 4,655,641 A | * | 4/1987 | Weyler | E02B 17/02 267/141.2 |
| 5,074,716 A | * | 12/1991 | Hollowell | E02B 17/027 405/224 |
| 5,356,239 A | * | 10/1994 | Canton | E02B 17/027 405/204 |
| 5,445,476 A | * | 8/1995 | Sgouros | E02B 17/00 285/382.4 |
| 5,741,089 A | | 4/1998 | Gallaher et al. | |
| 6,299,385 B1 | * | 10/2001 | Barnes | E02B 17/021 405/195.1 |
| 6,955,503 B1 | * | 10/2005 | Shivers, III | E02B 17/0004 405/203 |
| 2011/0314750 A1 | * | 12/2011 | Nies | F03D 1/001 52/173.1 |
| 2011/0318113 A1 | * | 12/2011 | Fraenkel | E02B 17/02 405/224 |
| 2015/0125220 A1 | * | 5/2015 | Glukhovskoy | E02B 17/027 405/227 |

FOREIGN PATENT DOCUMENTS

| | | |
|---|---|---|
| NO | 881536 A | 10/1988 |
| WO | WO-2009-139616 A2 | 11/2009 |

OTHER PUBLICATIONS

Search Report for GB Priority Application 1206377.2, dated Jun. 6, 2012.
Australian Examination Report No. 2 for application No. 2013246716, dated Dec. 8, 2016.

* cited by examiner

OFFSHORE STRUCTURE

CROSS-REFERENCE TO RELATED APPLICATIONS

This application is a 371 U.S. National Stage of International Application No. PCT/GB2013/050911 filed on Apr. 9, 2013, which claims priority to British Patent Application No. 1206377.2, filed on Apr. 11, 2012. The contents of the above applications are incorporated herein by reference in their entirety.

FIELD

The present invention relates to an offshore structure, for example an oil and or gas platform, and particularly to how available platform or deck space on such a structure can be extended.

BACKGROUND

Offshore structures, such as oil and or gas platforms, are common. Oil and or gas platforms are designed to perform a variety of functions, such as drilling wells, extracting oil or natural gas and storing and performing preliminary processing on any oil or natural gas that is recovered. In order to perform these various processes, an offshore platform must be able to house all the necessary facilities to perform those processes. However, in view of the engineering challenges and cost associated with building a structure that can withstand the natural environmental conditions, such as forces imparted by sea waves, and accidents such as collisions with moving vessels, offshore structures are usually designed to be as compact as possible. As such, the structures are designed to make as efficient use of space as possible.

Nonetheless, it sometimes becomes necessary for an offshore structure to perform new functions, for example due to changes in technology or due to engineering challenges in extracting resources as they become depleted. In such cases it may become necessary to deploy new machinery and/or facilities on the existing structure. In some cases this is possible by replacing existing facilities. However, that is not always the case.

Therefore, it sometimes becomes necessary to provide more space on an offshore structure. One option is to create further decks or levels on the existing structure. Another option is to extend the platform sideways using cantilevered sections from the side of the existing structure. Another option is to create an entire new offshore structure in the vicinity of the first structure, and then to link the two structures together by a bridge, for example.

However, there are various disadvantages associated with the existing methods of extending offshore structures. Modifying an existing structure, by introducing new decks, strengthening existing decks, or adding cantilevered sections to the side of the structure can interfere with the ongoing functions of the offshore structure (such as drilling or extraction processes) requiring the structure to be taken offline while the upgrades are made. Further, such modifications can introduce increases in weight which must be borne by the existing structure, and this can be impractical in some circumstances. Creating a separate, second, structure, can also be impractical if the sea floor is already crowded with equipment and pipelines in the region of the first platform. Further, commissioning an entire new structure is expensive.

As an example of a previous method of extending an offshore structure, GB-B-1,525,242 discloses a conventional cantilever extension structure, supported by struts extending to the legs of the original structure, above the original foundation. As such the extension is supported by the legs, not the foundation. As another example, GB-A-2,203,782 discloses an extension structure built as a separate structure on a new foundation (different from the foundation of the original structure).

The present invention provides an alternative way of extending an existing offshore structure, and aims to at least partly solve some of the above-problems.

SUMMARY

According to an aspect of the present disclosure there is provided an offshore structure comprising: an original structure comprising a main platform supported via a foundation on a seabed; and an extension structure comprising a platform extension positioned laterally of the main platform; and a platform extension support, depending downwardly from the platform extension into contact with the foundation, so as to support the platform extension directly on the foundation.

According to this aspect, the present disclosure provides an extended offshore structure. The original structure is original compared to the extension structure. As such, the original structure may have been constructed as separate parts, or may have been previously extended. The overall extended structure can be constructed with minimal interference with the operation of the existing structure, because the extension does not interfere with the platform of the existing structure. Further, the platform extension support depends downwardly, optionally substantially vertically, into contact with the foundation of the original structure. As such by utilizing the existing foundation of the original structure, minimal under-water preparation is required. Even if some preparation is required, the amount of work is minimal, especially when compared to building an entirely stand-alone extension (linked via a bridge to the original structure, for example). Further, in comparison to a cantilevered extension, for example, the weight of the extension is transmitted directly from the extension to the foundation, and not via the existing structure. As such, the need to reinforce the existing structure to allow it to bear the weight of the extension and associated equipment is reduced. Therefore, this construction is very advantageous in situations where there is spare loading capacity in the foundation of the original structure, particularly when the main platform of the original structure does not completely overhang the foundations.

The foundation can comprise piles driven into the seabed. The extension structure can be directly supported on at least one of the piles, and in one arrangement can be directly supported on only one piling. Preferably, at least one pile has a machined upper surface, and/or has an open upper end. A bottom end of the platform extension support can fit into the open upper end of the piling. As such, the foundations provide a ready-made receiving point, in the form of the pilings, for supporting an extension. If the machined piling head or other machined upper surfaces have been removed, alternative connections are possible.

A flange can be positioned above the bottom end of the platform extension support, wherein the flange has an outer width larger than a width of the hollow upper end diameter of the piling. This ensures the extension is positioned securely.

A bottom end of the platform extension support can comprise a substantially conical point.

The extension structure can be a monocolumn structure. The monocolumn structure can depend substantially vertically downwardly from the extension platform. In this arrangement, the centre of gravity of the extension can be balanced over the foundation, and therefore the need for intermediate lateral bracing is reduced.

The monocolumn structure can taper in width at a lower end, in order to fit within a pile for example. By tapering the end of the platform extension support, it becomes easier to locate and centralize the end in the appropriate position on the foundation.

The offshore structure can further comprise a lateral brace connecting the extension structure to the original structure. This provides lateral stabilization of the extension structure. The brace can be in the form of truss, such as a two-dimensional truss. The truss can be connected to the extension structure by at least one bearing allowing both rotational and translational motion of the extension structure relative to the truss. This at least partially reduces the transmittal of any torsional forces or out of plane stresses into the truss as the extension structure moves in response to environmental loads or forces such as waves. The at least one bearing can comprise a bushing attached to the extension structure, and the truss can be connected by two of said bearings, and wherein the bushings of each bearing are substantially parallel to each other to allow relative vertical movement of the monocolumn (22) to the truss (50). Alternatively the truss could be in the form of a three-dimensional design.

According to another aspect of the present disclosure, there is provided a kit for extending an offshore structure, the offshore structure being supported via a foundation on a seabed, the kit comprising: an extension structure comprising a platform extension positionable laterally of a main platform of the offshore structure; and a platform extension support depending downwardly, in use, from the platform extension so as to come into contact with a foundation of the main platform, to support the platform extension directly on the foundations of the offshore structure.

According to another aspect of the present disclosure, there is provided a method of extending an offshore structure, the offshore structure comprising a main platform supported via a foundation on a seabed, the method comprising: providing an extension structure, comprising a platform extension and a platform extension support; positioning the platform extension laterally of the main platform; and positioning the platform extension support, depending downwardly from the platform extension, in contact with the foundation so as to support the platform extension directly on the foundation.

According to another aspect of the present disclosure, there is provided a bearing for permitting rotational and translational movement, the bearing comprising: an outer bearing element; an inner bearing element having an inner bearing surface and an outer bearing surface; and a bushing; wherein the inner bearing element is provided within the outer bearing element and bears against the outer bearing element along the outer bearing surface, such that the inner bearing element is free to rotate in at least two orthogonal directions; and wherein the bushing extends through the inner bearing element and the outer bearing element, such that the inner surface of the inner bearing element bears against the bushing and can undergo translation motional with respect to the bushing.

According to this aspect, a bearing that allows both rotation and translational movement between, for example, an offshore extension structure and a brace to an original structure. This reduces the transmission of torsional forces and stresses into the brace and original structure, and thereby helps reduce fatigue. As such, the bearing is well suited to use in offshore activities.

The outer bearing surface can be substantially the surface of a spherical segment. That is, the surface can be part of a spherical surface. The inner bearing surface can be substantially cylindrical. This allows a high degree of freedom of movement in the bearing.

The bearing can further comprise a housing providing a seal around the inner bearing member, outer bearing member and the outer surface of the bushing. The housing comprises a flexible section to allow the bearing to move, in use. The flexible section can, for example, be in the form of a bellows, allowing the housing to stretch and change shape as the bearing moves. These seals protect the bearing assembly from environmental contamination.

The bearing can further comprise a lip seal between the inner bearing member and the outer bearing member, and/or a flexible bellows housing lip seal between the inner bearing member and the bushing. This helps isolate the bearing surfaces from dirt or other substances that might increase the friction on the bearing surfaces, and therefore reduce the efficacy and life of the bearing.

BRIEF DESCRIPTION OF THE DRAWINGS

The present invention is described below, by way of example only, with reference to the accompanying Figures, in which.

DETAILED DESCRIPTION

As discussed above, the present invention is concerned with providing a new way of extending existing offshore structures.

Figure 1:
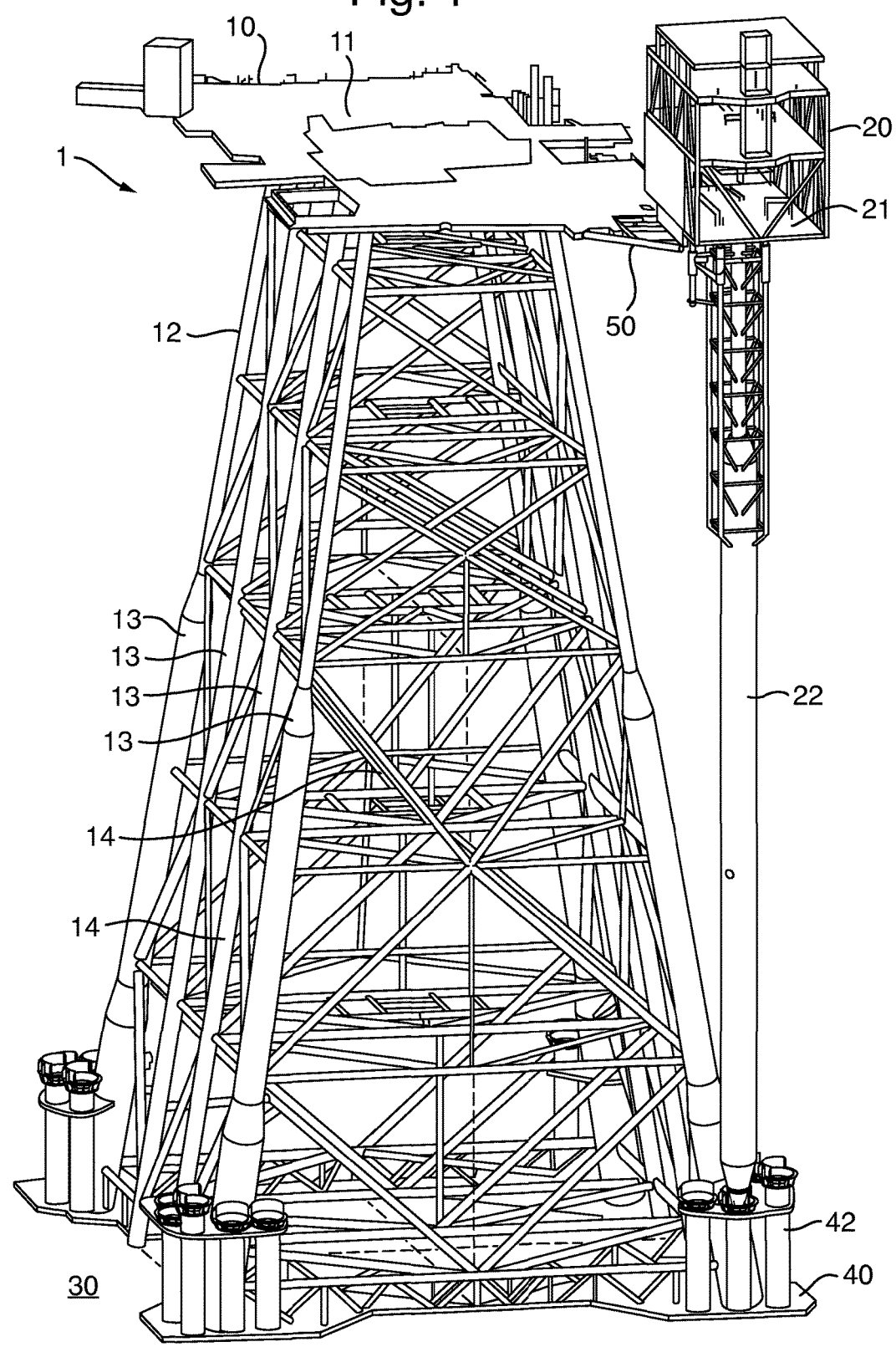
FIG. 1 is a drawing of an offshore structure, incorporating an original structure and an extension.

FIG. 1 shows a perspective view of an offshore structure (1), which comprises an original structure (10). The original structure (10) is a structure that is fixed to the sea bed (30). The original structure (10) comprises a main platform or deck section (11), which is supported above the sea surface. Although not shown in detail in FIG. 1, the main platform (11) will usually support equipment necessary for performing the normal functions of the offshore structure (1).

The main platform (11) is supported via a foundation (40) on the seabed. In FIG. 1, the main platform (11) is supported by the jacket section (12). Typically, such jacket sections (12) can be constructed from steel sections welded together, and are made from tubular sections that are cross-braced against each other. As can be seen in FIG. 1, the jacket section (12) may comprise leg sections (13) which extend from the sea floor (30) to the deck section (11). These legs (13) are then strengthened by the use of braces (14).

The jacket section (12) includes the foundations (40). Foundations (40) typically comprise piles (41) (see FIG. 2) which are driven into the sea floor through steel tubes (42) formed in the foundations (40).

Pilings (41) are typically steel tubes that are driven into the sea floor. The pilings (41) typically have a reinforced, machined, top end that has a thicker tube wall (for example 100 mm instead of 70 mm) for the purpose of driving the piling down into the sea floor.

In some cases, pilings (41) are not driven all the way into the sea floor, but are driven to the point at which they can be driven no further or have achieved the required penetration per hammer blows to meet designed capacity. In that case, the unused length of piling (41), not driven into the foundations, are usually cut short above the foundations, so that the free end of the pile does not extend a significant distance away from the foundations. However, if a piling (41) is driven to its full depth, no such cutting of the piling is required, and the machined top end is left intact. In either case, the piling (41) will usually have a hollow upper end.

FIG. 1 also shows an extension structure (20). Extension (20) is in the form of a mono column (22) and a module (21). The module is a form of additional platform section (21) above sea level. The platform extension (21) is positioned laterally of the main platform (11). It is not necessary for the platform extension (21) to be positioned at the same height as the main platform (11), although this may be advantageous in some circumstances. Further, the platform extension (21) may abut or even overhang the main platform (11) in some circumstances.

The extension (20) has an extension supporting section (22) extending downwardly from the extension platform section (21) and towards the foundations (40) of the original structure (10). The supporting section (22) extends into contact with the foundations (40), so that the extension (20) is supported directly on the foundations (40). That is, the foundation (40) bears the weight of the extension (20). Further, the foundation (40) bears the weight of the extension (20) directly, and not through the jacket (12) of the main structure, for example, in contrast to a cantilevered extension from a jacket section.

As such, although stand-alone monocolumn platforms as such are known, the extension (20) differs from those conventional columns, because it does not have its own supporting base. Further, such conventional structures are typically used in shallow water (e.g. about 50 m) and so providing lateral intermediate stabilisation truss (50) is not normally a major concern. In contrast, in the present invention, the monocolumn extension can be used in waters up to 140 m in depth or even more.

The monocolumn (22) is further connected to the original structure (10) via a truss section (50), which acts as a lateral brace for the monocolumn (22). The truss section (50) is above the sea surface. The truss section (50) provides a stabilising connection to the original structure, to hold the monocolumn (22) in place. The connection of the truss (50) to the monocolumn (22) is discussed in more detail below.

An upper section of the monocolumn (22) comprises a lattice truss construction around the central monocolumn core. The monocolumn core also reduces in width within this section. This reduces the environmental dynamic loading from the monocolumn (22) onto the main structure (10) via the truss (50) by providing a reduced surface area for waves to impact against. This reduces the force that any waves can apply to the monocolumn (22), whilst ensuring that the extension remains strong (to protect it, for example, against attendant vessel impacts). This arrangement therefore mitigates against fatigue occurring in the connections between the jacket (12) and truss (50) and the truss (50) and monocolumn (22).

Figure 2:
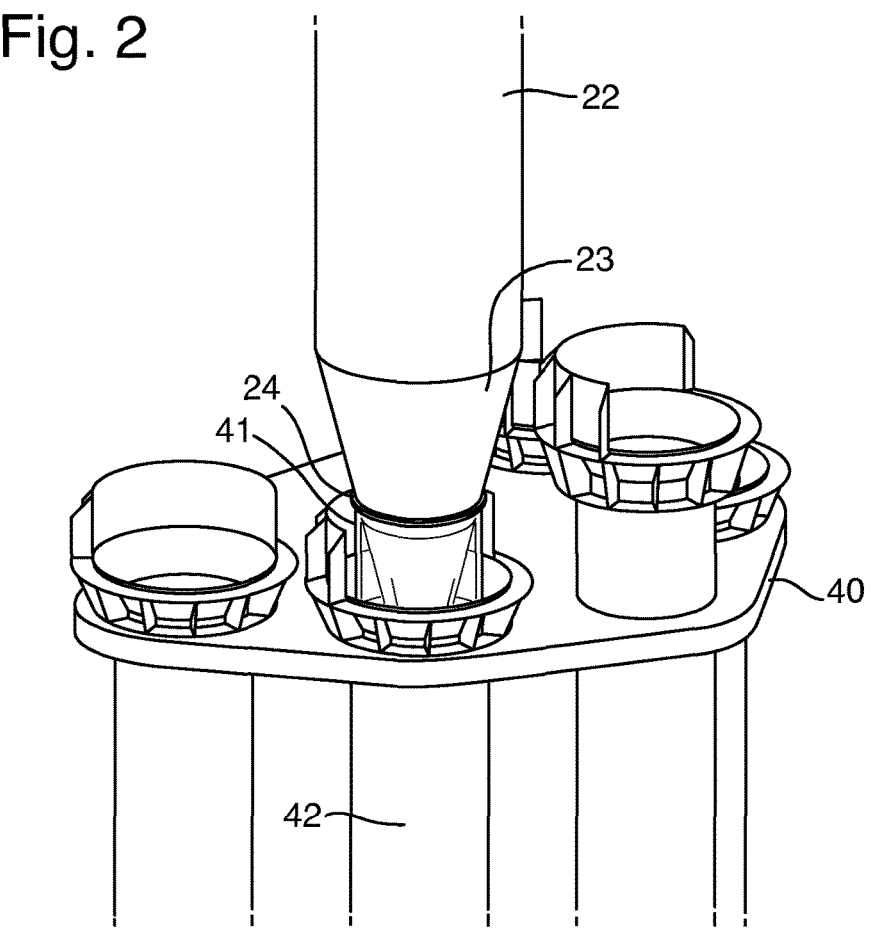
FIG. 2 is a drawing showing how the extension and original structure of FIG. 1 interconnect.

FIG. 2 shows a close up of how the bottom of the monocolumn (22) is supported directly on the foundations (40) and pile(s) (41). The bottom of the monocolumn (22) comprises a tapered section (23). The tapered section (23) is substantially cone shaped, and can, for example, form a two-step cone such as shown in FIG. 2. In FIG. 2, the step in the cone occurs below the flange (24) (discussed further below). It is not important for the tapered section (23) to be perfectly cone shaped. The purpose of the tapered section (23) is to reduce the width of the extension support (22) to assist in locating and centralising the mono column (22) in the foundations (40).

In FIG. 2, the monocolumn (22) is supported on the foundations (40) by locating the tapered section (23) within an upper end of the pile (41). Pile (41) has been driven into the tube structure (pile guides) (42) of the foundations (40). As such, the upper end of pile (41) is the machined end provided for driving the pile into the sea floor. If however, the pile had been cut after it was driven into the sea floor (for example, because the pile (41) was not driven to its full depth), the upper end of the pile (41) can be re-machined in situ, in order to provide a suitable hollow or socket for receiving the tapered section (23) of the monocolumn (22).

The bottom portion of the monocolumn (22) further comprises a steel flange (24) around the tapered section (23). The steel flange can be fully welded around the conical section of the monocolumn. The flange (24) provides a surface that can abut against the top of the pile (41), further assisting in locating the monocolumn into the foundations and helping in the transfer of load from the module (21) and the monocolumn (22) into the foundation piles (41). The flange (24) can have a width (usually a diameter) that is larger than the outer width (usually a diameter) of the pile (41) in which the extension section (22) is located. This ensures that that the extension (20) is located as securely as possible.

Figure 3:
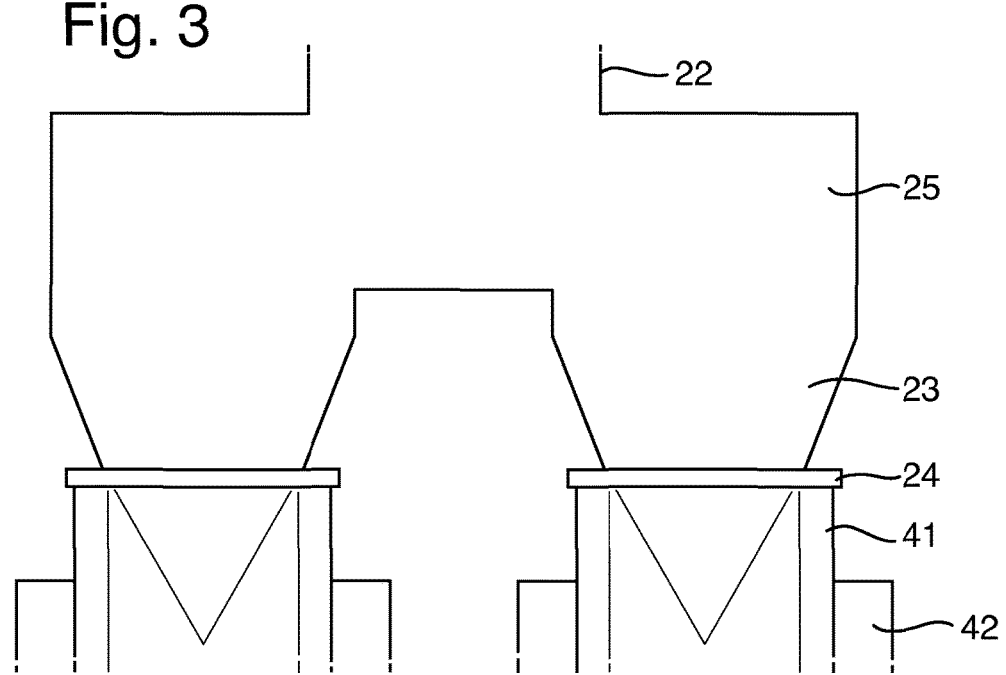
FIG. 3 is a schematic cross-section view of an alternative arrangement for connecting an extension and original structure.

Although FIG. 2 shows the monocolumn (22) fitting into a single pile (41) of the foundations (40), it may be desirable to support the monocolumn (22) on more than a single pile. This may be the case, for example, if there is not enough spare capacity in a single pile to support the extra weight of the extension. In that case, as shown schematically in FIG. 3, the bottom of the extension support (22) may comprise a cross beam (25) on which the main monocolumn (22) is supported, and which connects to multiple (two, in the case of FIG. 3) tapering sections (23) that can fit into piles (41) of the foundations (40). In such cases it may be necessary to prepare the foundations suitably, so that the load of the extension can be evenly supported across the piles (41).

Figure 4:
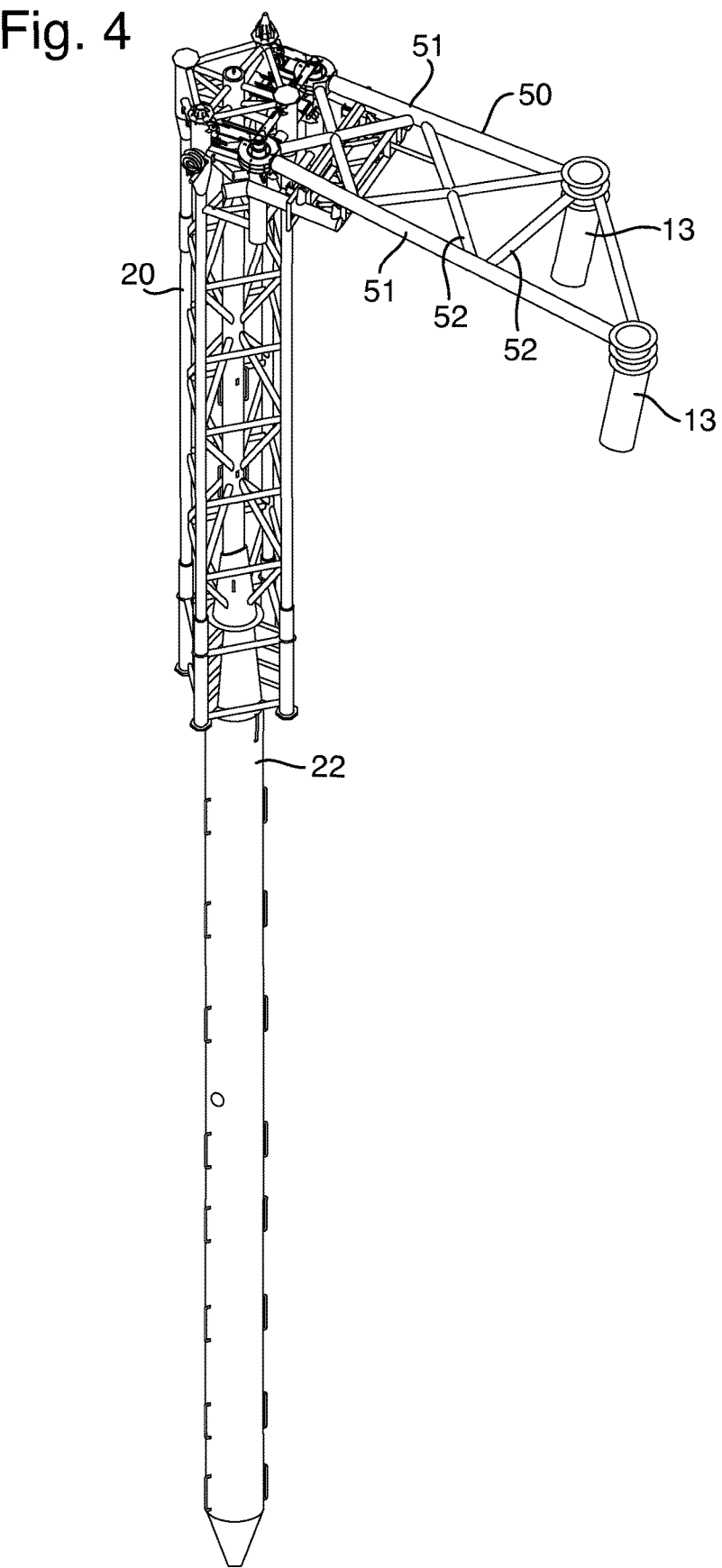
FIG. 4 is a drawing of an extension connected to a truss section that extends from the original structure.

FIG. 4 shows the monocolumn (22) (without the platform extension section (21)) attached to a brace, in the form of truss section (50). The truss section (50) extends to connect to two jacket legs (13). The truss section (50) comprises two main chord members (51), which are internally braced by brace sections (52). As such, the truss section (50) is a "two-dimensional" truss section, (although three-dimensional truss options are possible) meaning that the bracing sections (52) are within the plane between the two chord members (51). In general, any form of brace can be used, and the brace may connect to any part of the extension (20), such as the module (21) or the monocolumn (22).

In FIG. 4, the truss section (50) is rigidly attached (for example by welding) to the jacket legs (13). Bolting and grouting are alternative options for making the attachment. However, a different connection is made between the truss section (50) and the monocolumn extension (20).

Figure 5:
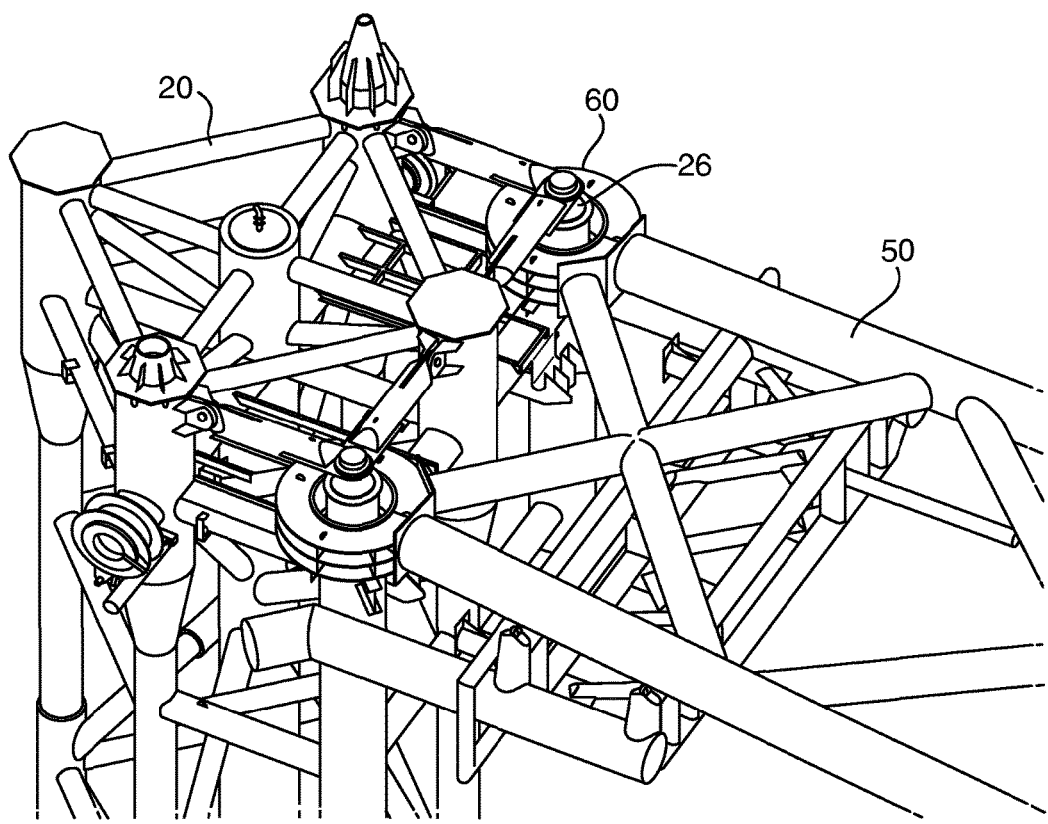
FIG. 5 is a close-up view of the connection between the extension and the truss section of FIG. 4.

FIG. 5 shows a close-up drawing of the upper portion of the monocolumn (22) of FIG. 4. As can be seen in FIG. 5, the truss section (50) is attached to the monocolumn (22) via a bearing joint (60) which acts a joint at the end of each chord (51). The bearing joints (60) are rigidly connected to the brace section, and in this case are welded to the chords (50). Further, the bearing joints (60) are set over support posts of the monocolumn (22), in a manner which allows both rotational and vertical movement between the monocolumn (22) and the truss section (50). This essentially creates a pin connection between the truss (50) and the monocolumn (22), and so isolates the truss from torsion and bending forces due to the motion of the monocolumn (22) relative to original structure (10).

Even though the extension (20) and original structure (10) share the same foundations, the monocolumn (22) and the original structure (10) will be subject to differing forces, due to waves or vessel impact for example. As such, the monocolumn (22) may twist and/or bend relative to the original structure (10).

Figure 6:
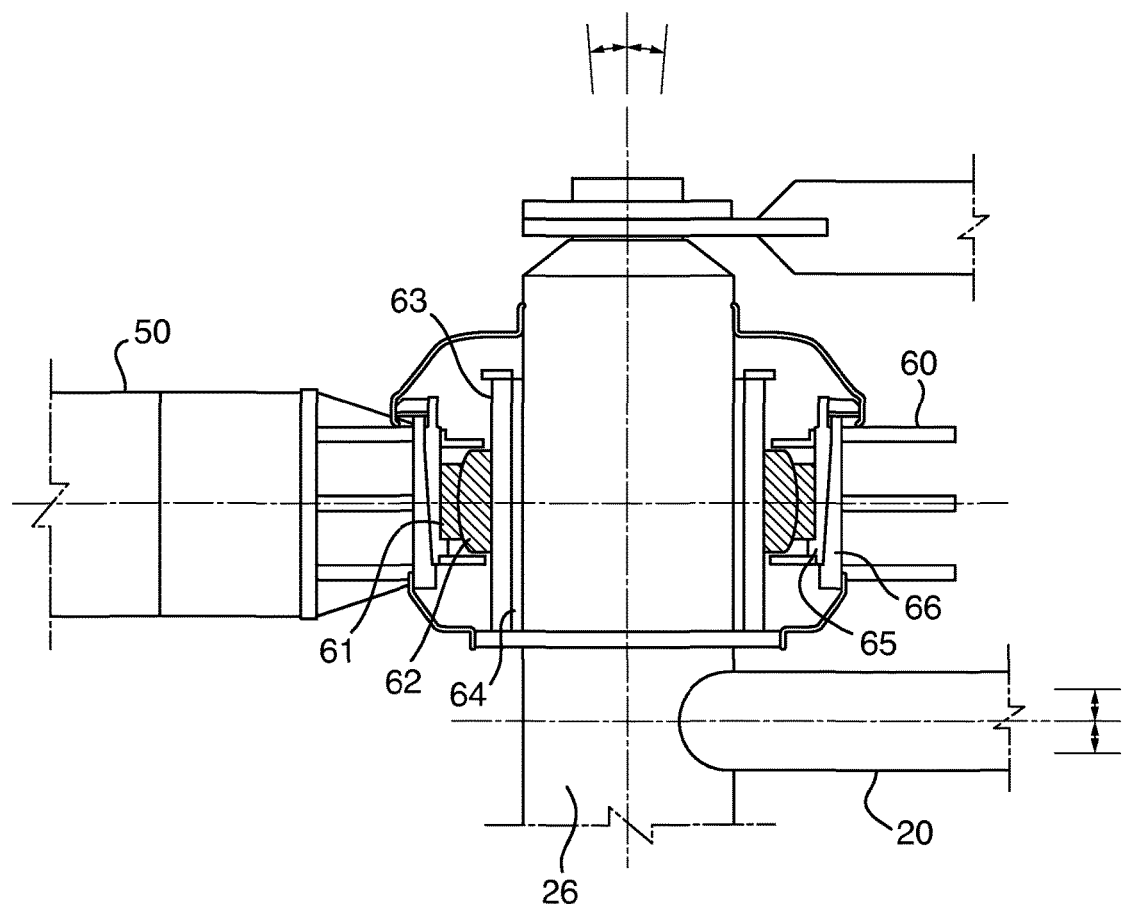
FIG. 6 is a schematic representation of the bearing joint between the truss section and extension of FIGS. 4 and 5.

The bearing joint (60) is shown in more detail in FIG. 6. Support post (26) of the monocolumn extension (20) is surrounded by cylindrical bushing (63). The bushing (63) is attached to the support column (26) via grouting (64), such that the bushing is held substantially motionless with respect to the support column (26).

The grouting (64) between the bushing (63) and the support column (26) allows for some adjustment when positioning the bushing (63) on the support column (26). This is helpful when there are multiple bearing joints (60), as it allows the cylindrical bushings to be aligned substantially parallel with each other, thus facilitating the same movements occurring in the individual bearings at the same time.

A spherical bearing, comprising an outer bearing member (61) and an inner bearing (62) are positioned around the bushing (63). The inner surface of the inner bearing member (62) bears against the outer surface of the cylindrical bushing (63). The inner surface of the inner bearing element (62) is preferably of cylindrical shape. The inner bearing element (62) is thus able to move parallel to the cylindrical axis of the bushing (63) (i.e. moving from one end of the bushing (63) to the other) and is also able to rotate around the bushing (63) (i.e. within a plane perpendicular to the cylindrical axis of the bushing (63). The bearing surfaces are lubricated in order to provide very low friction surfaces. The surfaces are the inner surface of the inner bearing element (62) and the outer surface of the bushing (63). Similarly, it is desirable to lubricate the outer surface of the inner bearing element (62) and the inner surface of the outer bearing element (61). Lubrication in the form of oil, grease, PTFE impregnated tape, for example, can be used.

The outer surface of the inner bearing element (62) is curved. The outer surface of the inner bearing element (62) bears against the outer bearing element (61). The outer bearing element has a bearing surface complimentary in shape to the outer bearing surface of the inner bearing element (62). Preferably, the outer bearing surface of the inner bearing element (62) is convex, and the bearing surface of the outer bearing element (61) is concave. Preferably, the outer bearing surface of the inner bearing element (62) is the surface of a spherical segment. That is, preferably the outer bearing surface of the inner bearing element (62) forms part of the surface of a sphere. This allows the greatest freedom of motion between the inner and outer bearing elements (61) and (62).

The spherical bearing (61) (62) allows for rotational movement between the truss section and the support column (26). As such, the combination of the spherical bearing and the bearing along the bushing (63) allows both rotational and translational movement between the truss (50) and the monocolumn (22), thus minimizing the transmission of any torsional stresses into the truss (50) due to motion of the monocolumn (22).

The bearing elements (61) and (62) are housed within a housing comprising elements (65) and (66). Housing elements (65) and (66) are designed to slide together in a wedge formation in order to assist in positioning the bearing joint on the support column (26).

Figure 7:
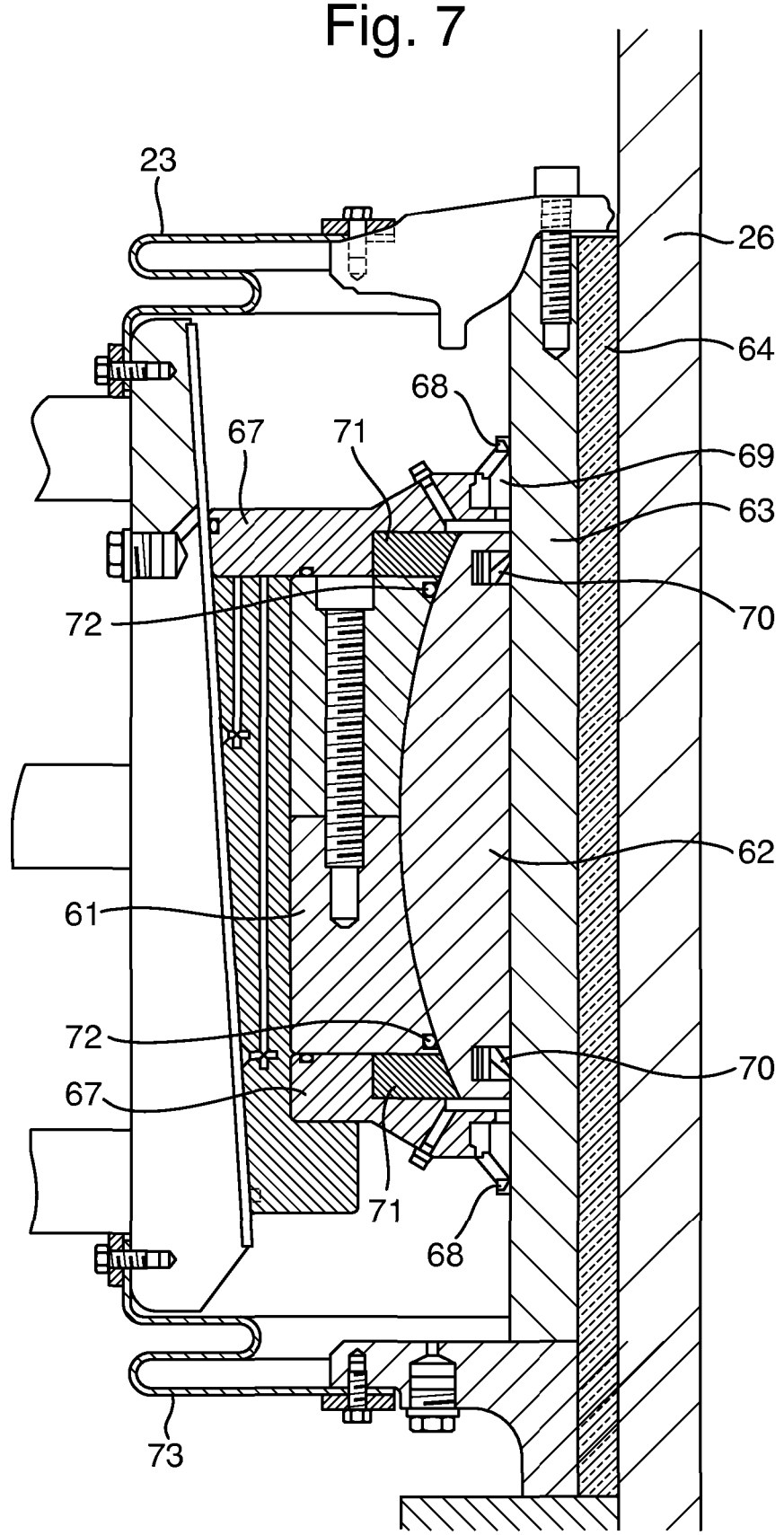
FIG. 7 is a more detailed schematic cross-section of the left-hand side of the bearing joint of FIG. 6.

Due to the harsh environmental conditions experienced on offshore structures, the bearing joint (60) incorporates several measures in order to ensure that the bearing surfaces are kept clean. FIG. 7 shows a close up of one side of the bearing. As can be seen, housing elements (67) extend over and under the outer bearing element (61), towards the bushing (63). However, the housing elements (67) themselves do not touch the bushing (63). A lip seal (68) positioned at the end of each housing element (67) near the bushing (63) extends to contact the face of the bushing. The lip seal may be energized by incorporating a ring spring, to bias the seal against the bushing. Further, a void (69) is created between the lip seal (68) and the inner bearing element (62). This void can be filled with grease in order to assist in the prevention of contaminates reaching the low friction bearing surfaces between the inner bearing element (62) and the bushing (63), and also the inner bearing element (62) and the outer bearing element (61).

A further lip seal (70) is present at the outer edges of the inner bearing surface of the inner bearing element (62). Once again, this lip seal provides an additional barrier to any dirt or contaminants, thus allowing the bearing surface (62) to move as freely as possible over the bushing (63).

Similarly, measures are taken to maintain the integrity of the bearing surface between the inner bearing member (62) and the outer bearing member (61). A protective packing (71) is positioned between the housing element (67) and the bearing element (61) and (62). Protective packing (71) is positioned at the outer interface of the bearing surface between the two bearing elements, and forms a physical barrier to prevent any contaminants entering between the two bearing elements. Additionally, an O-ring (72) is positioned towards the edge of the bearing surface of the outer bearing element, to provide an additional barrier to any contaminants.

In addition to these precautions, taken close to the individual bearing faces, the housing is further sealed by a flexible rubber bellows material (73), thus providing an overall seal between the outermost housing element (60) and the support column (26). The flexible nature of the bellows seal (73) allows for the seal to be maintained even as the extension (20) and the truss (50) move relative to each (i.e. even as the bearing joints (60) move).

Either or both of the lip seals (68) and (70) may be biased towards the bushing (63) by the use of a ring spring, for example.

In use, the monocolumn (22) is vertically supported on the foundations (40) of the original structure (10). The monocolumn (22) directly contacts the foundation (40). That is, the monocolumn (22) rests on the foundation (40). The truss (50) provides a means for transferring any lateral loads from the monocolumn (22) (i.e. induced by wave motion) to the jacket (12) of the original structure, thus providing lateral support for the monocolumn (22). Because the truss (50) is rigidly fixed to the jacket (12) (for example by welding) the possibility of stresses being induced in the truss (50) due to vertical forces/displacement at the monocolumn connection is minimized by the use of the bearing joints (60), which effectively form pin connections that are moment released. Monitoring of the bearing performance and the torsional loads in the truss are monitored by means of suitably positioned strain gauges and recording and monitoring system to detect any increased torsional loading into the truss should problems with the bearings occur. This allows preventative maintenance to be undertaken rather than shutting down the platform when fatal problems occur.

To further ensure that the pinned bearing joints (60) are free to move vertically, it may be desirable to support the weight of the truss (50) using additional hangers from the original structure (10).

The monocolumn (22) may be installed in place by a heavy lift vessel, for example. Once the extension platform has been positioned laterally of the original structure, vertical support can be provided whilst the extension is lowered and located into the pile (41) of the foundations (40) whilst lateral support can be provided by arms extending from the truss (50). As the monocolumn is installed, the truss can further be utilized to mount equipment to assist in the aligning of the column into the correct vertical alignment with respect to the platform, once the column is supported on the pile. As such, the monocolumn extension can be provided as a kit for extending an existing offshore structure.

Although the above description has focused on the provision of an extension (20) comprising a monocolumn (22), the concept of utilizing a foundation of an existing offshore structure to directly support an extension is applicable to any form of extension. For example, the extension could have two supporting legs that each supported on a different section of the foundation. Further, the extension support section need not be straight (although this gives benefits in terms of balance) and could incorporate dog-legs for example. Any alteration of the centre of gravity could be compensated for by attaching the extension to the original structure at higher points, to absorb the lateral load.

The above description is provided by way of example only, and is not intended to be limiting upon the scope of the invention. The scope of the invention is defined in the appended claims.

The invention claimed is:

1. An offshore structure comprising:
    an original structure comprising a main platform supported via a foundation on a seabed;
    an extension structure comprising a platform extension positioned laterally of the main platform and a platform extension support, depending downwardly from the platform extension, into contact with the foundation, so as to support the extension structure directly on the foundation; and
    a lateral brace connecting the extension structure to the original structure,
    wherein the brace is connected to the extension structure by at least one bearing allowing both rotational and translational motion of the extension structure relative to the brace.

2. The offshore structure according to claim 1, further comprising a flange positioned above the bottom end of the platform extension support, wherein the flange has an outer width larger than a width of the hollow upper end of the piling.

3. The offshore structure according to claim 1, wherein the bottom end of the platform extension support comprises a substantially conical point.

4. The offshore structure according to claim 1, wherein the extension structure is a monocolumn structure.

5. The offshore structure according to claim 4, wherein the monocolumn structure depends substantially vertically downwardly from the extension platform.

6. The offshore structure according to claim 4, wherein the monocolumn structure tapers in width at a lower end.

7. The offshore structure according to claim 1, further comprising a lateral brace connecting the extension structure to the original structure.

8. The offshore structure according to claim 7, wherein the brace is in the form of a truss.

9. The offshore structure according to claim 8, wherein the truss is a two-dimensional truss.

10. The offshore structure according to claim 1, wherein the at least one bearing comprises a bushing attached to the extension structure.

11. The offshore structure according to claim 10, wherein the brace is connected by two of said bearings, and wherein the bushings of each bearing are substantially parallel to each other.

12. The offshore structure according to claim 1, wherein the bearing includes: an outer bearing element; an inner bearing element having an inner bearing surface and an outer bearing surface; and a bushing, wherein the inner bearing element is provided within the outer bearing element and bears against the outer bearing element along the outer bearing surface, such that the inner bearing element is free to rotate in at least two orthogonal directions, and wherein the bushing extends through the inner bearing element and the outer bearing element, such that the inner surface of the inner bearing element bears against the bushing on the outer surface of the bushing and can undergo translation motional with respect to the bushing.

13. The offshore structure according to claim 1, wherein the foundation comprises pilings driven into the seabed, and wherein a bottom end of the platform extension support fits into a hollow upper end of the piling.

14. The offshore structure according to claim 13, wherein the extension structure is directly supported on more than one of the pilings.

15. The offshore structure according to claim 13, wherein the extension structure is directly supported on only one piling.

16. A kit for extending an offshore structure, the offshore structure being supported via a foundation having pilings driven into a seabed, the kit comprising:
    an extension structure comprising a platform extension positionable laterally of a main platform of the offshore structure; a platform extension support depending downwardly, in use, from the platform extension so as to come into contact with at least one of the pilings of the foundation of the main platform, to support the platform extension directly on the foundation of the offshore structure; and a lateral brace connecting the extension structure to the original structure, wherein the brace is connected to the extension structure by at least one bearing allowing both rotational and translational motion of the extension structure relative to the brace.

17. The kit according to claim 16, wherein a bottom end of the platform extension support fits into a hollow upper end of the piling.

18. The kit according to claim 16, wherein the at least one bearing comprises a bushing attached to the extension structure.

19. The offshore structure according to claim 18, wherein the brace is connected by two of said bearings, and wherein the bushings of each bearing are substantially parallel to each other.

20. A method of extending an offshore structure, the offshore structure comprising a main platform supported via a foundation on a seabed, the method comprising:

providing an extension structure, comprising a platform extension and a platform extension support;

positioning the platform extension laterally of the main platform;

positioning the platform extension support, depending downwardly from the platform extension, in contact with the foundation so as to support the platform extension directly on the foundation; and connecting a lateral brace to the extension structure by at least one bearing allowing both rotational and translational motion of the extension structure relative to the brace.

21. The method according to claim 20, wherein positioning the platform extension support in contact with the foundation includes positioning a bottom end of the platform extension support into a hollow upper end of a piling of the foundation.

* * * * *